(12) United States Patent
Kobayashi et al.

(10) Patent No.: US 11,432,596 B2
(45) Date of Patent: Sep. 6, 2022

(54) ARTICLES OF CLOTHING AND BRASSIERES

(71) Applicant: Fast Retailing Co., Ltd., Yamaguchi (JP)

(72) Inventors: Akemi Kobayashi, Yamaguchi (JP); Satomi Kobayashi, Yamaguchi (JP)

(73) Assignee: Fast Retailing Co., Ltd., Yamaguchi (JP)

( * ) Notice: Subject to any disclaimer, the term of this patent is extended or adjusted under 35 U.S.C. 154(b) by 0 days.

(21) Appl. No.: 16/470,937

(22) PCT Filed: Oct. 29, 2018

(86) PCT No.: PCT/JP2018/040018
§ 371 (c)(1),
(2) Date: Feb. 14, 2020

(87) PCT Pub. No.: WO2019/163201
PCT Pub. Date: Aug. 29, 2019

(65) Prior Publication Data
US 2020/0214367 A1      Jul. 9, 2020

(30) Foreign Application Priority Data

Feb. 22, 2018   (WO) ................ PCT/CN2018/076973

(51) Int. Cl.
*A41C 3/10*      (2006.01)
*A41C 3/14*      (2006.01)
(Continued)

(52) U.S. Cl.
CPC .................. *A41C 3/10* (2013.01); *A41C 3/12* (2013.01); *A41C 3/144* (2013.01);
(Continued)

(58) Field of Classification Search
CPC .. A41C 3/10; A41C 3/12; A41C 3/144; A41C 3/0014; A41C 3/0028; A41C 5/005; A41B 2500/50
(Continued)

(56) References Cited

U.S. PATENT DOCUMENTS 2,628,356 A    2/1953  Rosenfield et al.
2,940,454 A    6/1960  Faron
(Continued)

FOREIGN PATENT DOCUMENTS

CN    1823640 A    8/2006
CN    2935855 Y    8/2007
(Continued)

OTHER PUBLICATIONS

International Search Report and Written Opinion for International Application No. PCT/JP2018/040018, dated Jan. 22, 2019.
(Continued)

*Primary Examiner* — Gloria M Hale
(74) *Attorney, Agent, or Firm* — Wolf, Greenfield & Sacks, P.C.

(57) ABSTRACT

The present invention provides a brassiere having excellent fitting properties, allowing a greater number of wearers to obtain a sufficient fit for their breasts. The brassiere has a cup part for covering the wearer's breasts. The cup part includes an inner cup provided inside the cup part. The inner cup has an upper side portion. The upper side portion has a wave-shaped structure.

13 Claims, 7 Drawing Sheets

(51) Int. Cl.
  *A41C 3/12*  (2006.01)
  *A41C 3/00*  (2006.01)
  *A41C 5/00*  (2006.01)
  *B29L 31/48* (2006.01)

(52) U.S. Cl.
  CPC ......... *A41B 2500/50* (2013.01); *A41C 3/0014* (2013.01); *A41C 3/0028* (2013.01); *A41C 5/005* (2013.01); *B29L 2031/4885* (2013.01)

(58) Field of Classification Search
  USPC .............................................. 450/39, 54–57
  See application file for complete search history.

(56) References Cited

U.S. PATENT DOCUMENTS

| | | | |
|---|---|---|---|
| 2,988,087 | A | 6/1961 | Krieger |
| 4,091,819 | A * | 5/1978 | Huber ...................... A41C 3/10 |
| | | | 450/55 |
| 5,401,203 | A | 3/1995 | Fildan |
| 6,165,047 | A | 12/2000 | Scott et al. |
| 6,446,268 | B1 | 9/2002 | Lazarian |
| 6,540,585 | B1 * | 4/2003 | Lee ...................... A41C 3/0085 |
| | | | 2/267 |
| 7,232,359 | B1 | 6/2007 | Richardson |
| 7,422,508 | B2 | 9/2008 | Bentham |
| 7,677,952 | B2 | 3/2010 | Wooley |
| 8,128,457 | B2 | 3/2012 | Reinisch et al. |
| 9,402,424 | B2 | 8/2016 | Roy |
| 9,516,905 | B2 | 12/2016 | Pagnon |
| 9,788,579 | B2 * | 10/2017 | Miller .................. A41C 3/0085 |
| 9,897,940 | B2 | 2/2018 | Iida et al. |
| 10,165,803 | B2 | 1/2019 | Hoeven |
| 2002/0002023 | A1 | 1/2002 | Nakanishi |
| 2005/0266770 | A1 | 12/2005 | Henricksen |
| 2006/0030239 | A1 | 2/2006 | Clark |
| 2007/0049163 | A1 | 3/2007 | Lin |
| 2008/0070478 | A1 | 3/2008 | Shinomiya |
| 2010/0267312 | A1 | 10/2010 | Chien |
| 2011/0237157 | A1 * | 9/2011 | Scott .................... A41C 3/0028 |
| | | | 450/41 |
| 2011/0312245 | A1 | 12/2011 | Allen |
| 2012/0028540 | A1 | 2/2012 | Schmell |
| 2016/0037832 | A1 | 2/2016 | Kogon et al. |
| 2016/0050983 | A1 | 2/2016 | Ichiba et al. |
| 2016/0198774 | A1 | 7/2016 | Turlan-Van Der Hoeven |
| 2016/0360800 | A1 | 12/2016 | Yuasa et al. |
| 2018/0352874 | A1 | 12/2018 | Cahan et al. |
| 2019/0223521 | A1 | 7/2019 | Ikuta et al. |

FOREIGN PATENT DOCUMENTS

| | | |
|---|---|---|
| CN | 201789945 U | 4/2011 |
| CN | 103653285 A | 3/2014 |
| CN | 204048073 U | 12/2014 |
| CN | 205040675 U | 2/2016 |
| CN | 206062180 U | 4/2017 |
| CN | 206238458 U | 6/2017 |
| CN | 206744596 U | 12/2017 |
| EP | 1 166 657 A | 1/2002 |
| EP | 1 820 411 A | 8/2007 |
| EP | 2 705 765 A2 | 3/2014 |
| GB | 2 411 099 A | 8/2005 |
| JP | 3083695 U | 2/2002 |
| JP | 3094176 U | 6/2003 |
| JP | 2003-342806 A | 12/2003 |
| JP | 3109295 U | 5/2005 |
| JP | 2006-077354 A | 3/2006 |
| JP | 2006-144179 A | 6/2006 |
| JP | 2006-348423 A | 12/2006 |
| JP | 2008-144340 A | 6/2008 |
| JP | 2009-179891 A | 8/2009 |
| JP | 3177120 U | 7/2012 |
| JP | 2014-111854 A | 6/2014 |
| JP | 2014-196583 A | 10/2014 |
| JP | 2015-212435 A | 11/2015 |
| JP | 2017-226950 A | 12/2017 |
| KR | 10-1391314 B | 5/2014 |
| WO | WO 2017/143312 A1 | 8/2017 |
| WO | WO 2017/145191 A1 | 8/2017 |

OTHER PUBLICATIONS

PCT/JP2018/040018, Jan. 22, 2019, International Search Report and Written Opinion.

* cited by examiner

ARTICLES OF CLOTHING AND BRASSIERES

CROSS-REFERENCE TO RELATED APPLICATIONS

This application is a National Stage filing under 35 U.S.C. § 371 of International Application Serial No. PCT/JP2018/040018, filed Oct. 29, 2018, which claims priority to International Application Serial No. PCT/CN2018/076973, filed Feb. 22, 2018 and entitled "BRA CUP FOR A BRASSIERE AND MANUFACTURING METHOD THEREOF." The entire contents of each of the applications listed above is incorporated herein by reference.

TECHNICAL FIELD

The present invention relates to articles of clothing and brassieres.

BACKGROUND ART

An article of clothing having a cup part, such as a brassiere (being an underwear item for women), may be designed to have an inner cup (a molded cup) inside the cup part so as to exhibit increased force to hold the breasts of the wearer (see Patent Document 1).

CITATION LIST

Patent Document

Patent Document 1: JP2014-111854 A

SUMMARY

Technical Problem

The cup part of the above type of brassiere usually has a lower level of stretchability and deformability. Accordingly, such brassiere becomes less flexible and unable to sufficiently follow the volume, shape, position, etc., of the breasts of individual wearers, so that some wearers may feel that the brassiere insufficiently fits their breasts.

The present invention has been made under the above-described circumstances. An object of the present invention is to provide an article of clothing, such as a brassiere, having excellent fitting properties so as to provide a sufficient fit for a greater number of wearers.

Solution to Problem

According to an aspect of the present invention, an article of clothing (1) is provided, having a cup part (10) for covering breasts of a wearer who wears the article of clothing (1), wherein the cup part (10) has an inner cup (52) provided inside the cup part (10), the inner cup (52) has an upper side portion (70), and the upper side portion (70) has a waved-shape structure.

Advantageous Effects of Invention

The present invention provides articles of clothing, such as brassieres, that are excellent in terms of fitting properties so as to provide a sufficient fit for a greater number of wearers.

DESCRIPTION OF EMBODIMENTS

Hereinafter, preferred embodiments of the present invention will be described with reference to the attached drawings. It should be noted here that the same elements will be given the same reference numerals and repetitive explanations for those elements will be omitted. It should also be noted that the various dimensional ratios shown in the drawings are not limited to those illustrated in the drawings. The below embodiments are just examples for describing the present invention and the present invention is not limited to the described embodiments.

Overall Brassiere Configuration

Figure 1:
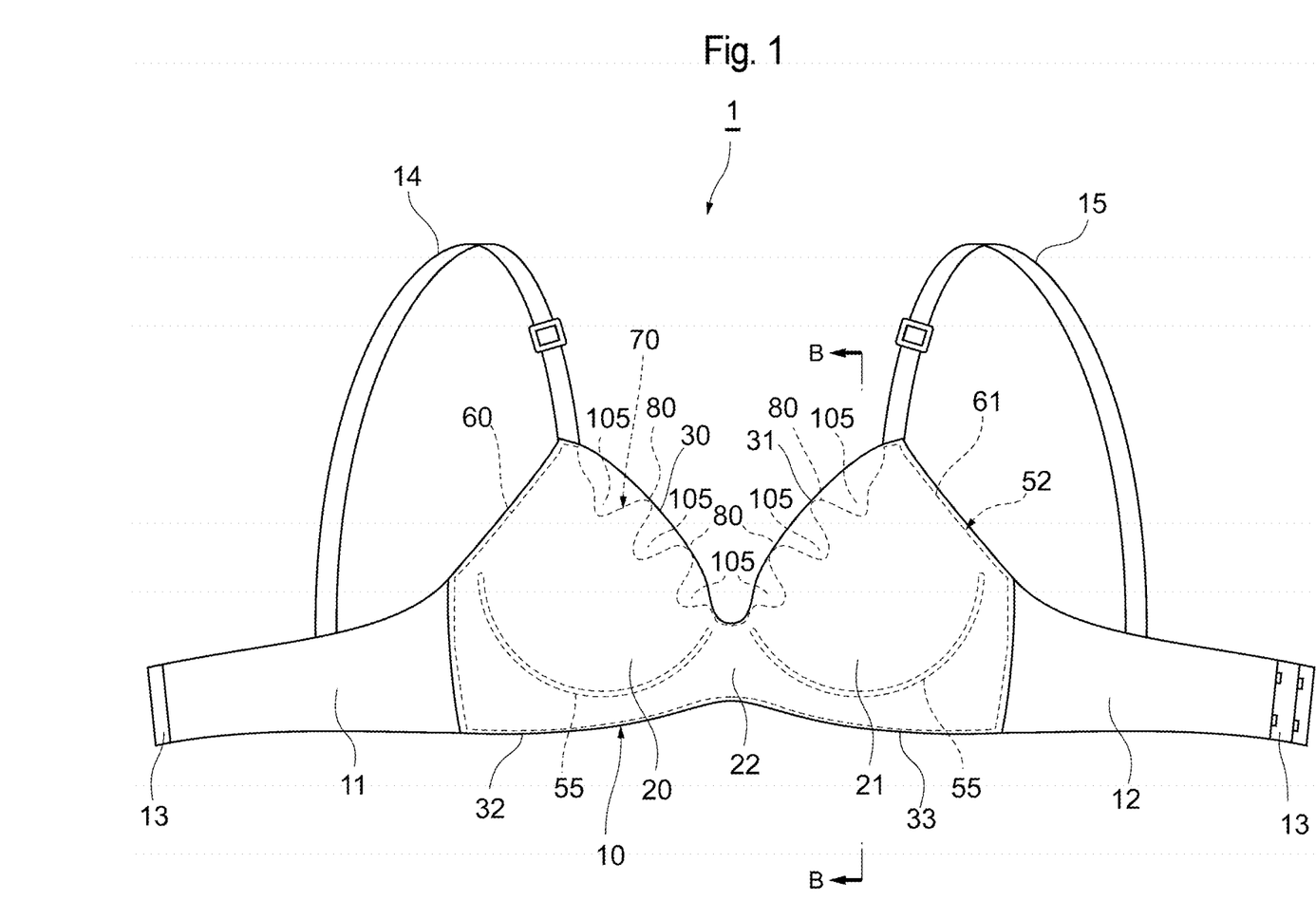
FIG. 1 is an illustration for explaining an example of the configuration of a brassiere.

FIG. 1 is an illustration for explaining an example of the configuration of a brassiere 1, which is an article of clothing according to the present embodiment. The brassiere 1 includes, for example: a cup part 10 that covers the breasts of the wearer who wears the brassiere 1; back parts 11 and 12 provided on the right and left outer sides of the cup part 10 to cover the underarms and back of the wearer; fastening parts 13 provided at the respective outer ends of the back parts 11 and 12 so as to fasten the back parts 11 and 12 to each other; and straps 14 and 15, each provided so as to extend from the cup part 10 over the shoulder of the wearer and connected to the back part 11, 12. FIG. 1 illustrates the brassiere 1 when viewed from the front, with the back parts 11 and 12 unfastened and spread laterally. The words "upper," "lower," "up," "down," "left" and "right," as used herein, refer to the corresponding directions shown in this front view of FIG. 1. Furthermore, the term "forward" refers to a direction extending toward the front of FIG. 1, while the term "backward" refers to a direction extending toward the back of FIG. 1.

The cup part 10 is shaped such that the right and left halves thereof are symmetrical when viewed from the front, and its width in the up-and-down direction increases from the right and left ends thereof toward the center and then gradually decreases toward the center. For example, the cup part 10 has right and left cup portions 20 and 21 and a connecting portion 22 that connects the right and left cup portions 20 and 21. Each cup portion 20, 21 has a bowl shape that protrudes forward in a three-dimensional manner so as to fit the shape of the wearer's breast. The cup portion 20, 21 has an upper edge 30, 31 which gradually rises from the connecting portion 22 at the center toward the outer side in the right-and-left direction when viewed from the front. The upper edge 30, 31 is smoothly curved so as to protrude upward when viewed from the front. The cup portion 20, 21 also has a lower edge 32, 33 which protrudes downward by being curved from the connecting portion 22 at the center toward the outer side in the right-and-left direction when viewed from the front.

Overall Configuration of the Cup Part

Figure 2:
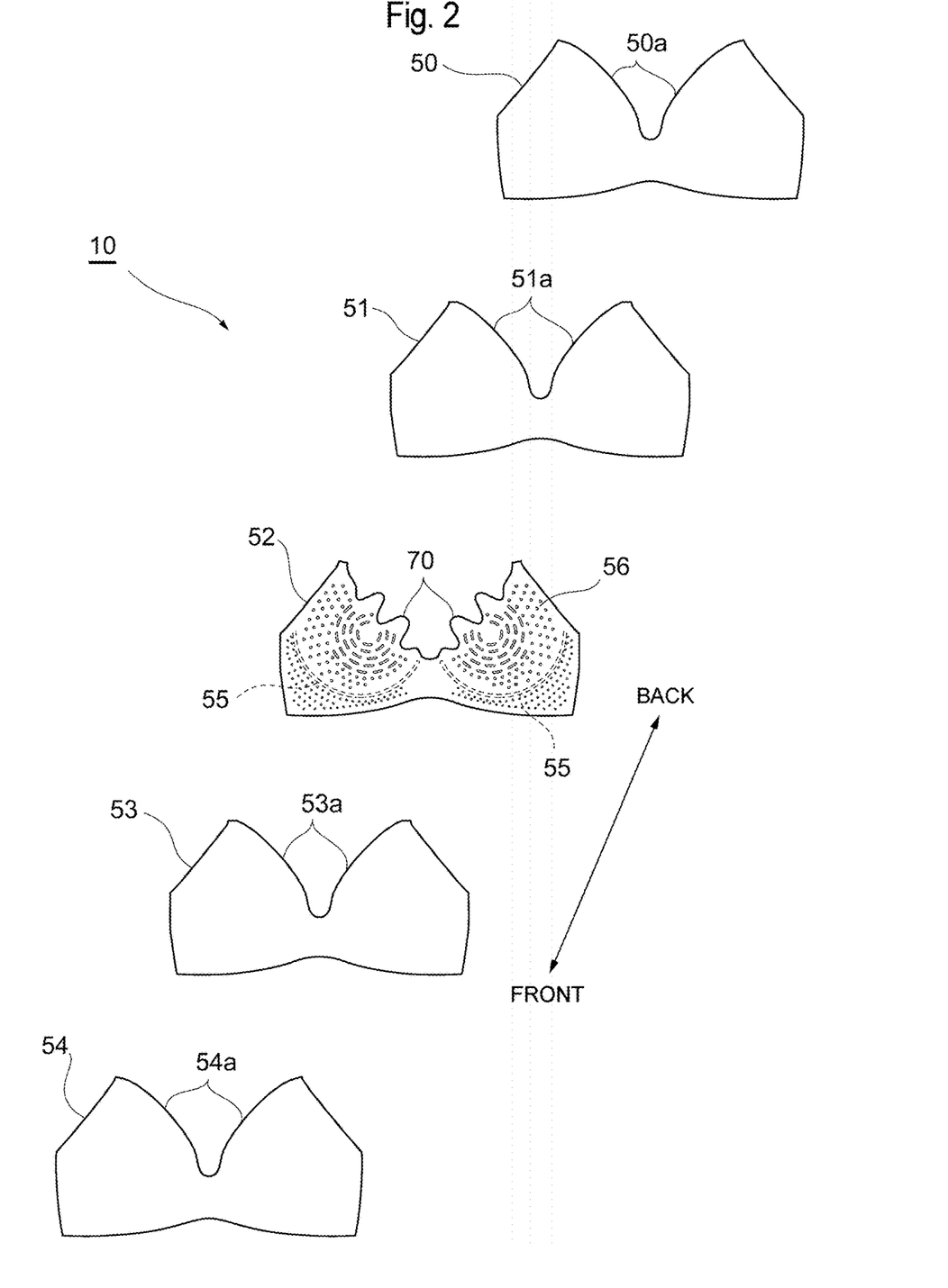
FIG. 2 is an exploded illustration for explaining each layer of a cup part.
Figure 3:
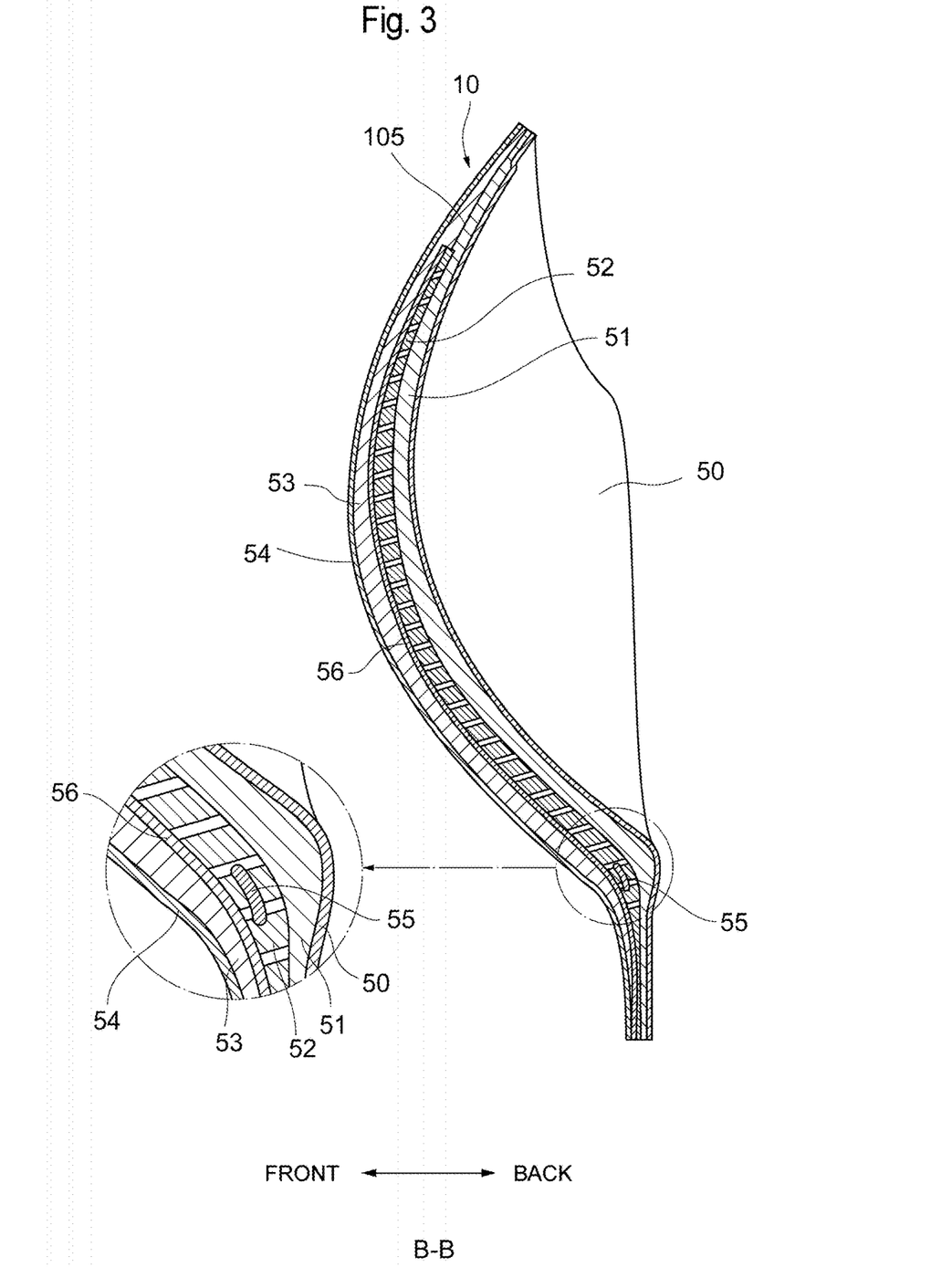
FIG. 3 is an illustration for explaining an example of the vertical cross-section of a cup part.

As shown in FIGS. 2 and 3, the cup part 10 has a layered structure formed of a plurality of layers stacked in the front-and-back direction. The cup part 10 includes, for example, a backing cloth 50, a cushion layer 51, an inner cup 52, a cushion layer 53 and an outer cloth 54, which are layered in this order from the back side (rear side) to the front.

The backing cloth 50 and the outer cloth 54 are not particularly limited and each may be made of, for example, a nylon fiber cloth. The cushion layers 51 and 53 are each made of a foaming material, such as a urethane foam. The cushion layers 51 and 53 each have a thickness of, for example, about 2 mm to 2.5 mm. The cushion layers 51 and 53 have elasticity and flexibility that are higher than those of the backing cloth 50, the outer cloth 54 and the inner cup 52. As illustrated in FIG. 2, the backing cloth 50, the cushion layers 51 and 53, and the outer cloth 54 respectively have upper edges 50a, 51a, 53a and 54a, each of which gradually rises from the center toward the outer side in the right-and-left direction in the same way as the upper edges 30 and 31 of the cup part 10.

The inner cup 52 is, for example, a urethane foam, such as nylon polyurethane. The inner cup 52 is formed through injection molding. For example, the inner cup 52 is more rigid than the cushion layers 51 and 53 and functions so as to retain the three-dimensional shape of the cup part 10. The inner cup 52 has a thickness of, for example, around 0.5 mm to 4.5 mm. The material for the inner cup 52 is not limited to a urethane foam, and nonwoven fabric, knit material or other knitted fabric may also be used. A resin wire 55 is provided inside the lower part of the inner cup 52. The detailed configuration of the inner cup 52 will be described later.

A mesh layer 56 is provided at the front surface side of the inner cup 52. The mesh layer 56 is provided so as to support the retention of the shape of the inner cup 52, and the mesh layer 56 is made of cloth. The mesh layer 56 is bonded to the entire surface, or a part of the surface of the inner cup 52. The elasticity and flexibility of the mesh layer 56 are higher than those of the inner cup 52.

The cup part 10 is formed by, for example, integrating the above-described cushion layer 51, inner cup 52, mesh layer 56, and cushion layer 53 by means of thermal compression bonding, etc., and then sewing the resulting integrated layers with the backing cloth 50 and the outer cloth 54.

Configuration of the Inner Cup

Figure 4:
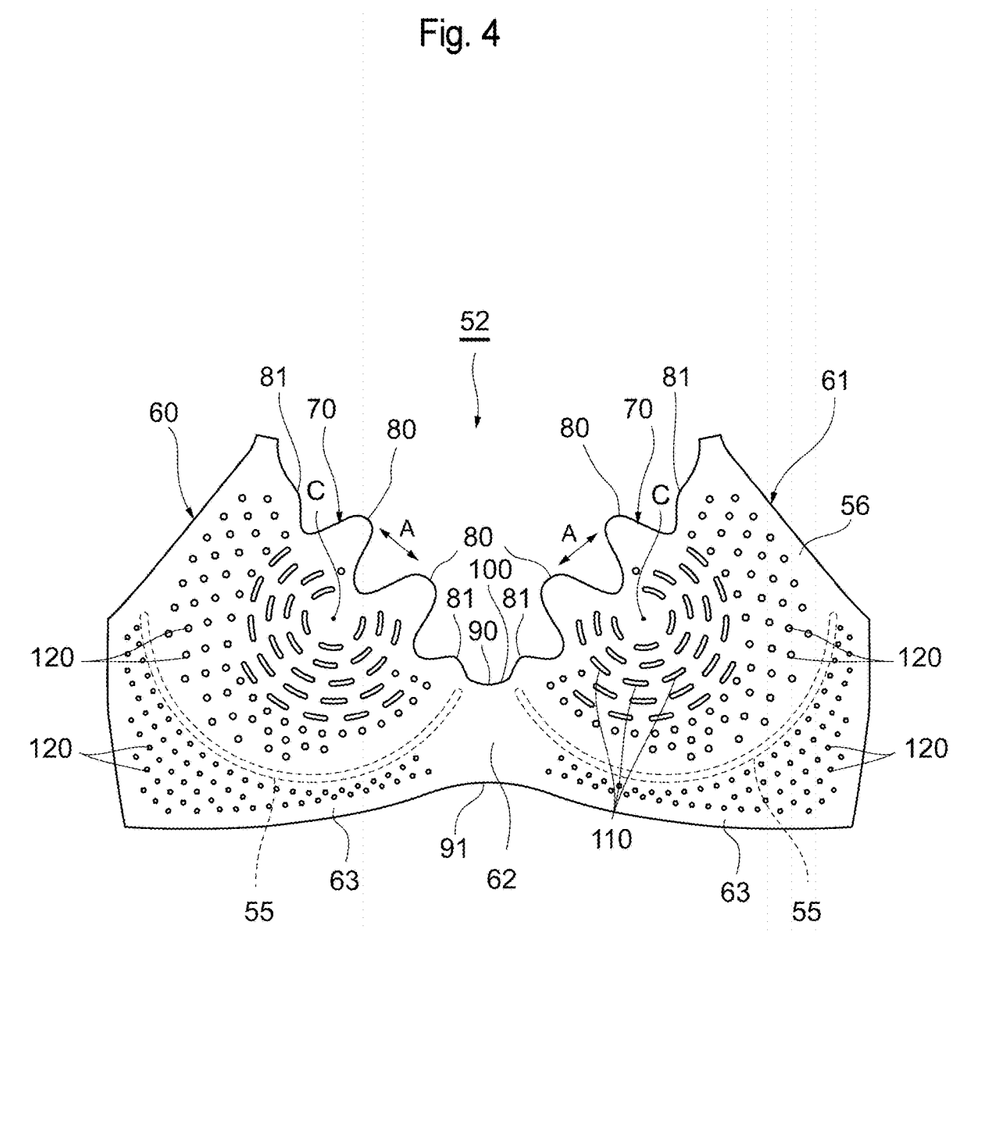
FIG. 4 is a front view of an inner cup.
Figure 5:
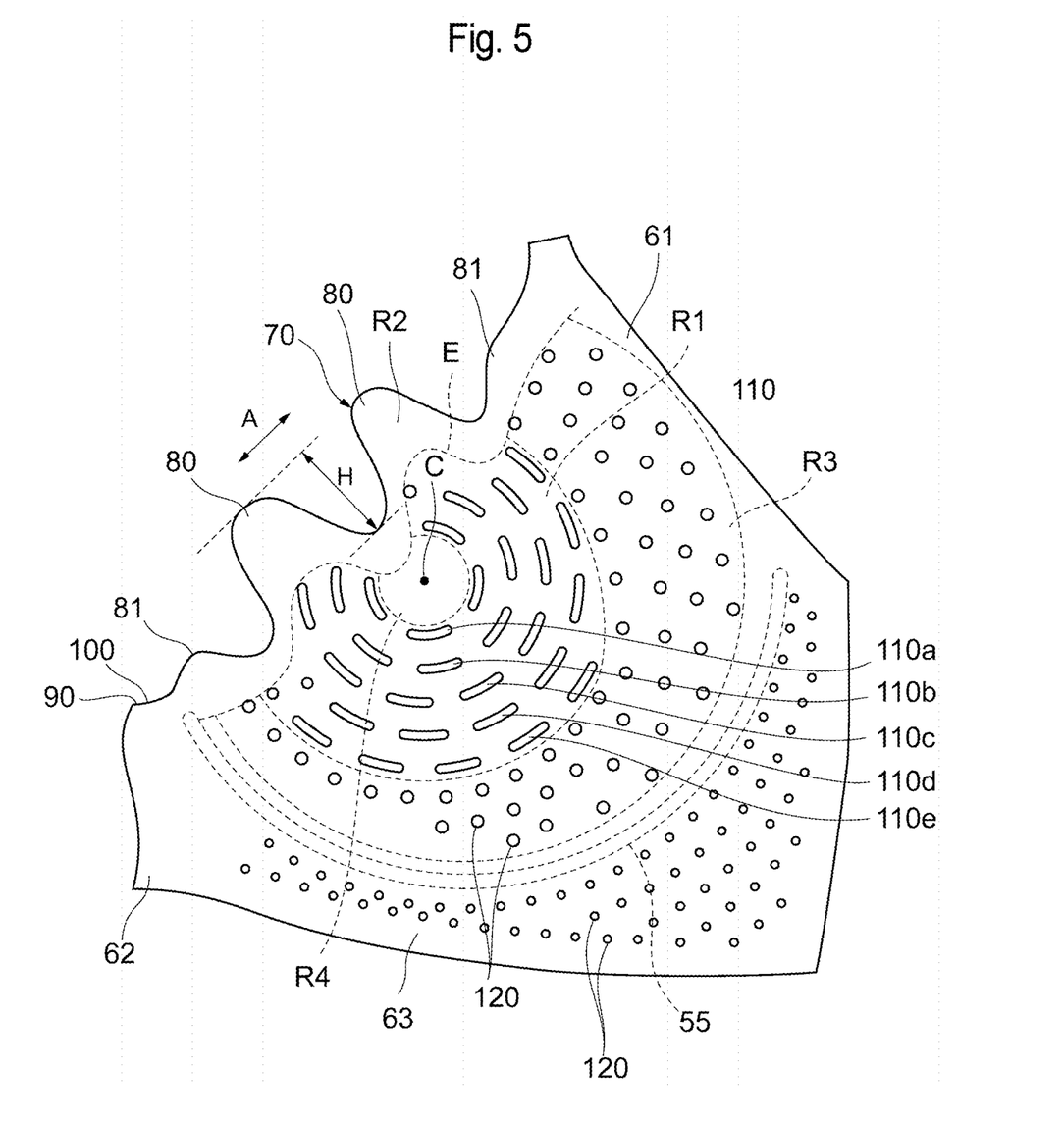
FIG. 5 is an enlarged view of an inner cup.

The inner cup 52 has, for example, inner cup portions 60 and 61 which are symmetrical in the right-and-left direction and cover the breasts of the wearer, a joining part 62 that joins the inner cup portions 60 and 61, and a breast support 63 that supports the lower part of the breasts of the wearer, as illustrated in FIGS. 4 and 5.

The overall shape of each inner cup portion 60, 61 is like a bowl that protrudes forward. Each inner cup portion 60, 61 has an upper side portion 70 which gradually rises from the joining part 62 toward the outer side in the right-and-left direction when viewed from the front. The upper side portion 70 has, for example, a waved shape and is structured to be stretchable in a direction along the upper side (this direction will be referred to as the upper-side direction A, which is shown by the arrow in FIGS. 4 and 5). In other words, the upper side portion 70 easily stretches in the upper-side direction A. Furthermore, the upper side portion 70 has waves 80 and 81, each protruding upward so as to be narrowed. With this configuration, the upper side portion 70 easily deforms in the front-and-back direction.

The upper side portion 70 has a plurality of first waves 80 (e.g., two relatively large waves) near the center in the upper-side direction A, and has relatively small second waves 81 on both sides of the first waves 80 (e.g., one second wave 81 on each side). The first waves 80 each have a height H (as shown in FIG. 5) of, for example, 10 mm or larger, and preferably 10 mm or larger and 14 mm or smaller.

As shown in FIG. 4, the joining part 62 is placed between the inner cup portions 60 and 61 and its width in the up-and-down direction is the smallest in the inner cup 52. The joining part 62 has a waved upper side portion 90 that continues to the upper side portions 70.

The upper side portion 90 has, for example, a wave 100 that is shaped so as to be dented downward. The wave 100 smoothly continues to the second waves 81 of the right and left inner cup portions 60 and 61, with such second waves 81 protruding upward. Accordingly, the inner cup 52 has a waved shape that extends continuously over the respective upper side portions 70 of the inner cup portions 60 and 61 and the upper side portion 90 of the joining part 62. This waved shape of the inner cup 52 has a symmetry in the right-and-left direction when viewed from the front. The joining part 62 has a lower side portion 91 which is smoothly dented upward.

As illustrated in FIGS. 1 and 2, each of the upper edges 30 and 31 of the cup part 10 smoothly descends toward the center in the right-and-left direction so as to have a curved shape protruding upward. As shown in FIG. 2, the backing cloth 50, cushion layers 51 and 53, and outer cloth 54, which constitute the cup part 10, have the upper edges 50a, 51a, 53a, and 54a, respectively, and these upper edges are similar to the upper edges 30 and 31 of the cup part 10. Meanwhile, the inner cup 52 has the waved upper side portion 70. As depicted in FIG. 1, the upper edges 30 and 31 of the cup part 10 extend so as to substantially connect the top of each first wave 80 of the inner cup 52. The dented portions formed on both sides of the waves 80 act as a cut portion (space) 105 receding relative to the upper edge 30, 31 of the cup part 10. Such cut portion 105 is, for example, filled with the front- and back-side cushion layers 51 and 53, and the cushion layers 51 and 53 are directly bonded to each other in the cut portion 105, as shown in FIG. 3.

As illustrated in FIG. 4, the resin wire 55 is placed along the lower edge of each inner cup portion 60, 61 and curved so as to protrude downward.

The inner cup portions 60 and 61 each have a plurality of elongated holes 110 provided around the cup top C, which corresponds to the top of the wearer's breast. Each elongated hole 110 is placed so as to be long in the circumferential direction about the cup top C. The plurality of elongated holes 110 is provided, for example, in a spiral or concentric arrangement. The plurality of elongated holes 110 is provided in multiple layers (e.g., three to ten layers) in the radial direction about the cup top C as the center. With such plurality of elongated holes 110, the inner cup portions 60 and 61 are stretchable in a three-dimension manner toward the front.

As illustrated in FIG. 5, the circumferential dimension of each of the plurality of elongated holes 110 increases with increasing distance from the cup top C. For example, the circumferential (longitudinal) dimension of each elongated hole 110 increases step by step with increasing distance from the cup top C. For example, when the plurality of elongated holes 110 is provided in five layers in the radial direction, the circumferential length of the first-layer elongated holes 110a, which are the nearest to the cup top C, is smaller than the circumferential length of the second- and third-layer elongated holes 110b and 110c, and the circumferential length of the second- and third-layer elongated holes 110b and 110c is smaller than the circumferential length of the fourth- and fifth-layer elongated holes 110d and 110e. Further, the plurality of elongated holes 110 is arranged so that the positions of radially adjacent ones of the plurality of elongated holes 110 are shifted relative to each other in the circumferential direction.

The inner cup portions 60 and 61 each have, for example, a first region R1 in which the above-described elongated holes 110 are provided, and second, third and fourth regions R2, R3 and R4 where no elongated holes 110 are provided.

The second region R2 is, for example, a region including the upper side portion 70 of the inner cup 52. This region is in a waved shape having a width in the up-and-down direction.

The first region R1 and the second region R2 have a waved boundary line E (which is an imaginary line) therebetween. The tops and bottoms of the waves of the boundary line E match the tops and bottoms of the waves of the upper side portion 70 in the second region R2. More specifically, each wave top of the boundary line E is located at a position corresponding to the position of each wave top of the upper side portion 70, and each wave bottom of the boundary line E is located at a position corresponding to the position of each wave bottom of the upper side portion 70.

The third region R3 is located on the opposite side of the first region R1 with respect to the upper side portion 70 of the inner cup portion 60, 61, so that the first region R1 is sandwiched between the third region R3 and the upper side portion 70. The third region R3 is, for example, an arc-shaped region partially surrounding the first region R1.

The fourth region R4 is a circular region around the cup top C, including the cup top C.

Each inner cup portion 60, 61 further includes air holes 120 (having, for example, a circular shape) that are provided in the third region R3.

As shown in FIG. 4, no elongated holes 110 are provided in the joining part 62 and the breast support 63. Instead, the breast support 63 has circular air holes 120. The air holes in the breast support 63 have a smaller diameter than the diameter of air holes 120 provided in the inner cup portions 60 and 61.

The elongated holes 110 and air holes 120 provided in the inner cup 52 are covered by the mesh layer 56.

Effects of the Brassiere

The effects of the brassiere 1 having the above-described configuration will now be described. The brassiere 1 includes the inner cup 52 provided inside the cup part 10. The inner cup 52 has the inner cup portions 60 and 61 each having the waved upper side portion 70, and this upper side portion 70 is stretchable in the upper side direction A. The upper side portion 70 is also deformable in the front-and-back direction F. The inner cup portions 60 and 61 each have a plurality of elongated, circumferentially long holes 110 around the cup top C, and, with these holes 110, the inner cup portions 60 and 61 are stretchable in a three-dimensional manner toward the front.

Figure 6:
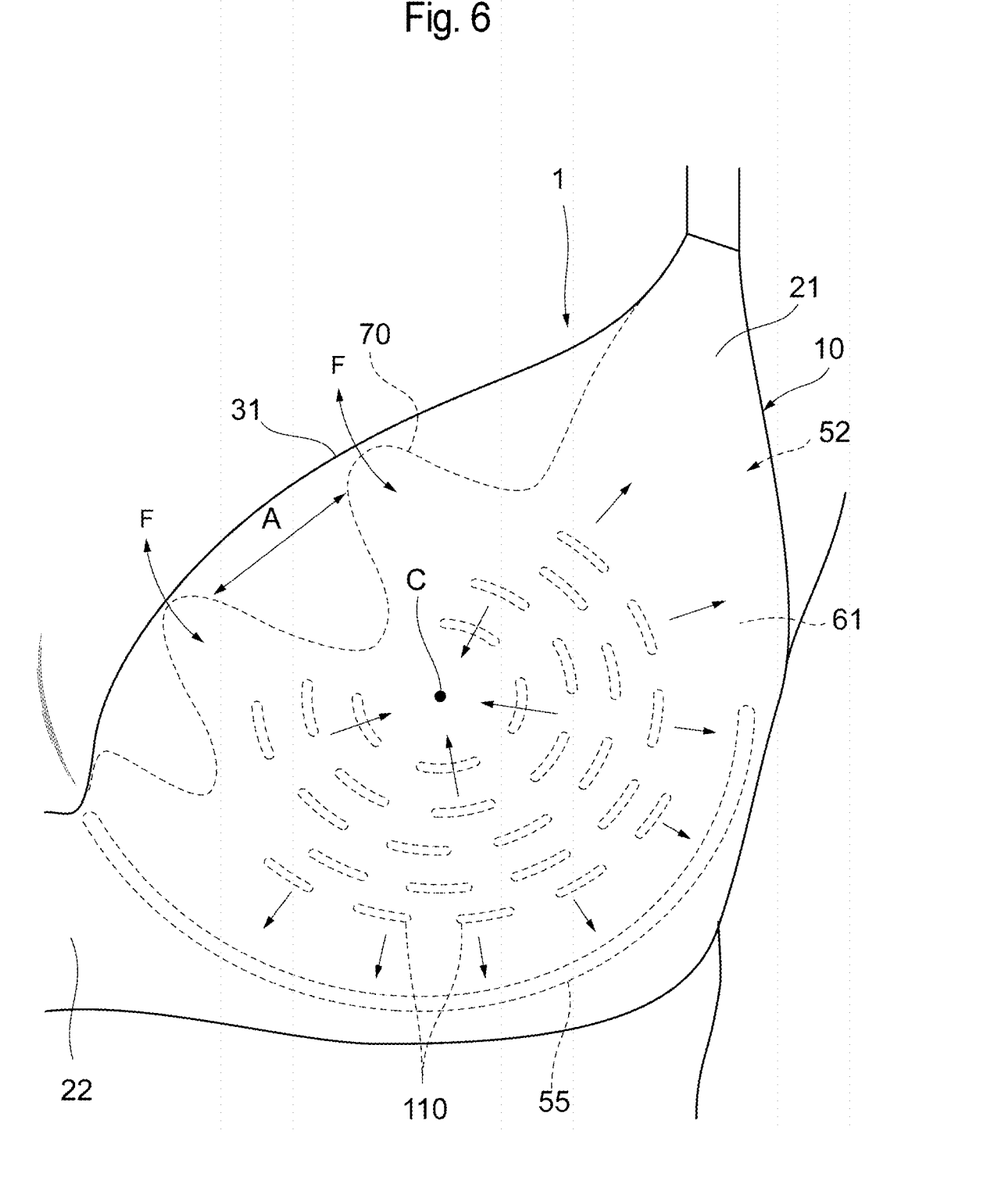
FIG. 6 is an illustration for explaining an example of a state of an inner cup of a brassiere when the brassiere is worn.
Figure 7:
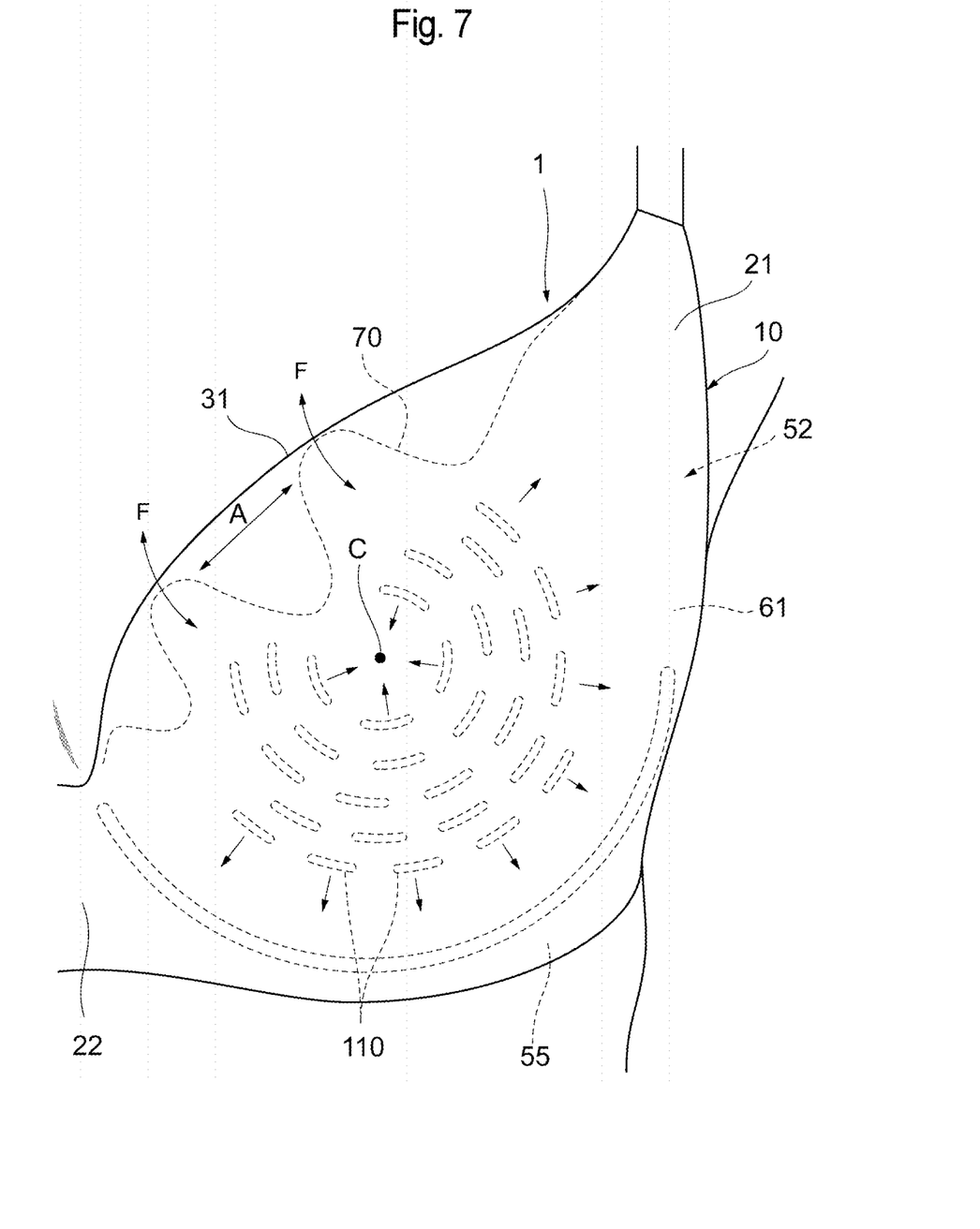
FIG. 7 is an illustration for explaining an example of a state of an inner cup of a brassiere when the brassiere is worn.

When a person puts on the brassiere 1, the upper side portions 70 of the inner cup portions 60 and 61 stretch in the upper side direction A and deform in the front-and-back direction F, according to the volume, shape, position, etc., of the breasts of the person (wearer), and furthermore, the inner cup portions 60 and 61 stretch in a three-dimensional manner toward the front. For example, as shown in FIG. 6, when the wearer's breasts are relatively large, the waves of the upper side portions 70 stretch in a relatively large amount in the upper side direction A and the inner cup portions 60 and 61 stretch in a three-dimensional manner in a relatively large amount toward the front. For example, as shown in FIG. 7, when the wearer's breasts are relatively small, the waves of the upper side portions 70 stretch in a relatively small amount in the upper side direction A and the inner cup portions 60 and 61 stretch in a three-dimensional manner in a relatively small amount toward the front. Furthermore, in FIGS. 6 and 7, the upper side portions 70 deform in the front-and-back direction F according to the surface shape of the breasts. In this manner, the inner cup 52 of the brassiere 1 deforms according to the volume and shape of the wearer's breasts, so as to fit the wearer's breasts.

According to the present embodiment, each upper side portion 70 of the inner cup 52 has a structure of a waved shape, and this waved structure enables the upper side portion 70 of the inner cup 52 to stretch and deform so as to follow the volume and shape of the breasts of each wearer. As a result, a greater number of wearers can obtain a sufficient fit for their breasts, and the brassiere 1 of the present embodiment will be a brassiere having excellent fitting properties. Furthermore, the upper side portion 70 having such waved structure does not apply an excessively large tightening force when it stretches, and this provides a good fit for the wearer's breasts while maintaining the shape of the breasts. Moreover, the upper side portion 70 having the waved structure is able to adequately hold the breasts of the wearer in a predetermined shape, so that the brassiere 1 of the present embodiment can also control the shape of the breasts. Accordingly, the brassiere 1 is able to control the breasts of the wearer in a beautiful shape, while providing a good fit for the breasts.

The waved structure of the upper side portion 70 is stretchable in the direction along the upper side portion 70, and this structure further helps the upper side portion 70 in following the volume and shape of the wearer's breast.

The waved structure of the inner cup 52 is formed continuously over the respective upper side portions 70 of the right and left inner cup portions 60 and 61 and the upper side portion 90 of the joining part 62, so that the inner cup 52 as a whole has improved stretching properties in the upper side direction A.

The inner cup 52 has a plurality of elongated holes 110, each being long in the circumferential direction about the cup top C, which corresponds to the top of the wearer's breast, and this increases the stretching properties of the inner cup 52 in the direction toward the front of the wearer (i.e., in the direction in which the breasts swell). As a result, the stretching properties of the inner cup 52 increase in both the upper side direction A and the forward direction, leading to the brassiere 1 being capable of following the three-dimensional shape of the wearer's breasts and providing a further improved fit for their breasts.

Since the plurality of elongated holes 110 is provided concentrically or spirally about the cup top C, the inner cup 52 stretches more easily toward the front, leading to the brassiere 1 being capable of providing a further improved fit for the breasts.

The plurality of elongated holes 110 is provided in such a manner that the circumferential length of each hole 110 increases with increasing distance from the cup top C. In this case, the inner cup 52 will be sufficiently stretchable in the direction toward the front even at a position distant from the cup top C, leading to the brassiere 1 being capable of providing a further improved fit for the breasts. It should be noted that the arrangement in which "the circumferential length of each hole 110 increases with increasing distance from the cup top C" is not limited to an arrangement in which the circumferential length increases step by step with increasing distance from the cup top C, but also includes an arrangement in which the circumferential length increases gradually with increasing distance from the cup top C.

Since the upper side portion 70 of the inner cup 52 has a region in which no elongated holes 110 are provided (i.e., the second region R2), such region enables the inner cup 52 to be maintained in a good shape.

The inner cup 52 has the first region R1 provided with the elongated holes 110 and the second region R2 adjacent to the first region R1, with the second region R2 being in the upper side portion 70 and having no elongated holes 110 provided therein. Further, the first region R1 and the second region R2 have the waved boundary line E, and the tops and bottoms of the waves in this boundary line E correspond to the tops and bottoms of the waves of the upper side portion 70. This configuration ensures that the second region R2 in the upper side portion 70 having no elongated holes 110 has a certain width along the upper side portion 70, and accordingly, the stretch of the upper side portion 70 in the upper side direction A can be sufficiently obtained throughout the upper side portion 70. As a result, the upper side portion 70 is able to stretch sufficiently to provide a good fit for the wearer's breasts, while controlling the wearer's breasts in a beautiful shape.

The inner cup 52 further has the third region R3 located on the opposite side of the first region R1 with respect to the second region R2 of the upper side portion 70, so that the first region R1 is sandwiched between the third region R3 and the second region R2, wherein the third region R3 partially surrounds the first region R1 and has no elongated holes 110 provided therein. In this case, the third region R3, which has relatively low stretching properties, is provided directly below the stretchable first region R1, so that the lower part of the wearer's breasts can be held in an adequate manner.

The inner cup 52 also has a region in which no elongated holes 110 are formed (i.e., the fourth region R4) around the cup top C, and this configuration can respond to the demands of wearers who would prefer to control and reduce the protrusion of the tops of their breasts toward the front.

The inner cup 52 has the breast support 63 for covering and supporting the lower part of the wearer's breasts, and no elongated holes 110 are formed in such breast support 63. This configuration enables the wearer's breasts to be supported from below and kept adequately in a good shape.

The mesh layer 56 for covering the elongated holes 110 is placed over the surface of the inner cup 52, and this can aid in retaining the shape of the inner cup 52.

The cup part 10 has the cushion layers 53 and 51 on the front-surface side (on the side of the outer cloth 54) and on the back-surface side (on the side of the backing cloth 50) of the inner cup 52, respectively, and this configuration enables, for example, flattening of the front and back surfaces of the cup part 10, improvement in the touch of the cup part 10, and protection of each component of the cup part 10.

The brassiere 1 of the above-described embodiment is structured such that the inner cup 52 has waved upper side portions 70 and elongated holes 110. However, the present invention is not limited to the above structure, and may be configured so as to have no elongated holes 110. Furthermore, according to a reference embodiment, the inner cup 52 may be configured so as to have elongated holes 110, without having the waved upper side portion 70. This configuration also increases the stretching properties of the inner cup 52 for the wearer in the direction toward the front (i.e., the direction in which the wearer's breasts swell) due to the presence of the circumferentially elongated holes 110 around the cup top C of the inner cup 52. As a result, a greater number of wearers are able to obtain a sufficient fit for their breasts, resulting in a brassiere 1 that is excellent in fitting properties.

Furthermore, the shape of each upper side portion 70 of the inner cup 52 and the number of waves formed in the upper side portion 70 are not limited to those in the above-described embodiment. The upper side portion 70 of the inner cup 52 may be in a different shape, as long as the upper side portion 70 includes a waved structure. Moreover, the waved shape is not limited to a pattern of smoothly curved waves, and other zigzag patterns, such as repeating patterns of triangular waves or square waves, are also included in the waved shape.

The shape, number and arrangement of the elongated holes 110 are not limited to those in the above-described embodiment. For example, the elongated holes 110 in the above embodiment have a uniform width in the circumferential direction, but the elongated holes 110 may instead be holes having portions whose widths vary in the circumferential direction. Further, the shape and structure of the cup part 10, and the shape and structure of the inner cup 52 are not limited to those in the above-described embodiment. Moreover, the shape and structure of the brassiere 1 are not limited to those in the above-described embodiment.

For example, the brassiere 1 of the above-described embodiment has straps 14 and 15, and such straps 14 and 15 may be detachable. Moreover, the brassiere 1 may be designed to have no such straps 14 and 15. The above embodiment has described a brassiere as an example of an article of clothing, but the present invention can be applied to other clothing articles having cups, such as other underwear items having cups.

INDUSTRIAL APPLICABILITY

The present invention is useful in providing articles of clothing, such as brassieres, that are excellent in fitting properties so that a greater number of wearers can obtain a sufficient fit for their breasts.

REFERENCE SIGNS LIST

1 BRASSIERE
10 CUP PART
50 BACKING CLOTH
52 INNER CUP
54 OUTER CLOTH
60, 61 INNER CUP PORTION
70 UPPER SIDE PORTION
110 ELONGATED HOLE

What is claimed is:

1. An article of clothing (1) having a cup part (10) for covering breasts of a wearer who wears the article of clothing (1), wherein the cup part (10) includes an inner cup (52) provided inside the cup part (10), the inner cup (52) has an upper side portion (70), and the upper side portion (70) has a wave-shaped structure, wherein the inner cup (52) has a plurality of elongated holes (110) provided around a cup top (C), the cup top (C) corresponding to a top of the breast of the wearer, wherein the elongated holes (110) are elongated in a circumferential direction about the cup to (C), and wherein a mesh layer (56) that covers the elongated holes (110) is provided on a surface of the inner cup (52).

2. The article of clothing (1) according to claim 1, wherein the wave-shaped structure is stretchable in a direction along the upper side portion (70).

3. The article of clothing (1) according to claim 1, wherein the inner cup (52) has right and left inner cup portions (60, 61) and a joining part (62) that joins the right and left inner cup portions (60, 61), and wherein the wave-shaped structure is provided continuously throughout the upper side portion (70) of the right and left inner cup portions (60, 61) and the upper side portion (90) of the joining part (62).

4. The article of clothing (1) according to claim 1, wherein the plurality of elongated holes (110) is provided concentrically or spirally about the cup top (C).

5. The article of clothing (1) according to claim 4, wherein a circumferential dimension of each of the plurality of elongated holes (110) increases with increasing distance from the cup top (C).

6. The article of clothing (1) according to claim 1, wherein the upper side portion (70) of the inner cup (52) has a region (R2) in which no elongated holes (110) are provided.

7. The article of clothing (1) according to claim 6, wherein the inner cup (52) has a first region (R1) in which the elongated holes (110) are provided and a second region (R2) adjacent to the first region (R1), the second region (R2) being a region in the upper side portion (70) in which no elongated holes (110) are provided, wherein the first region (R1) and the second region (R2) have a waved boundary line (E) therebetween, and wherein tops and bottoms of waves of the waved boundary line (E) correspond to tops and bottoms of waves of the waved shape of the upper side portion (70).

8. The article of clothing (1) according to claim 7, wherein the inner cup (52) has a third region (R3) located on an opposite side of the first region (R1) with respect to the second region (R2) of the upper side portion (70), with the first region (R1) being sandwiched between the third region (R3) and the second region (R2), wherein the third region (R3) partially surrounds the first region (R1) and no elongated holes (110) are provided in the third region (R3).

9. The article of clothing (1) according to claim 1, wherein the inner cup (52) has a region (R4) in which no elongated holes (110) are provided around the cup top (C).

10. The article of clothing (1) according to claim 1, wherein the inner cup (52) further includes a breast support (63) that covers and supports a lower part of the breasts of the wearer, and wherein no elongated holes (110) are provided in the breast support (63).

11. The article of clothing (1) according to claim 1, wherein the cup part (10) has respective cushion layers (51, 53) on a front-surface side and a back-surface side of the inner cup (52).

12. The article of clothing (1) according to claim 1, wherein the article of clothing (1) is a brassiere.

13. An article of clothing (1) having a cup part (10) for covering breasts of a wearer who wears the article of clothing (1), wherein the cup part (10) includes an inner cup (52) provided entirely inside the cup part (10), the inner cup (52) has an upper side portion (70), the upper portion (70) has a wave shaped structure, wherein the wave shaped structure is stretchable in a direction along the upper side portion (70), and wherein the inner cup (52) has right and left inner cup portions (60, 61) and a joining part (62) that joins the right and left inner cup portions (60, 61), and wherein the wave-shaped structure is provided continuously throughout the upper side portion (70) of the right and left inner cup portions (60, 61), and the upper side portion (M90) of the joining part (62).

* * * * *